Feb. 21, 1933.  W. C. WITHERLY  1,898,330
DIFFERENTIAL
Filed Feb. 20, 1932

INVENTOR
WILLIAM CLIFFORD WITHERLY
BY Fehersatonhaugh & Co
ATTORNEYS

Patented Feb. 21, 1933

1,898,330

UNITED STATES PATENT OFFICE

WILLIAM CLIFFORD WITHERLY, OF VANCOUVER, BRITISH COLUMBIA, CANADA

DIFFERENTIAL

Application filed February 20, 1932. Serial No. 594,352.

My invention relates to improvements in differentials which are particularly adapted for use in motor vehicles. The objects of the invention are to provide means whereby driving and free wheeling may be selectively obtained through the differential in either direction; means for imparting a positive drive to either wheel coupled to the differential, so that a vehicle can be driven when one driving wheel has by virtue of snow or mud lost its traction, and means for providing an instantaneous pick up of the load or the total elimination of lost motion in the driving parts.

The invention consists essentially of a differential having a driven housing, a pair of aligned shafts and a clutch mechanism for normally imparting a drive to either or both of the shafts in one direction, which clutch mechanism is capable of being set to drive the shafts in the opposite direction, as will be more fully described in the following specification and shown in the accompanying drawing, in which:—

In the drawing like characters of reference indicate corresponding parts in each figure.

Figure 1:
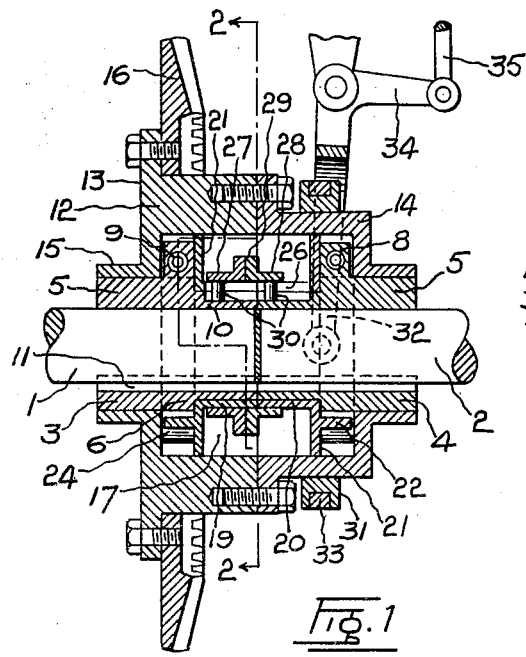
Fig. 1 is a longitudinal sectional view of the invention taken on the line 1—1 of Figure 2.

The numerals 1 and 2 indicate aligned shafts to which are respectively keyed bushings 3 and 4. Each of the bushings consists of a circular portion 5, the outer end of which forms a bearing for the housing to be hereinafter described, a substantially square intermediate portion 6, having clutch faces 7 and 7A which are separated from each other by radial lugs 8 each of which are apertured as at 9, and a circular inner portion 10 which is provided with a longitudinal slot or keyway 11, as shown in Figure 1 in full line and in Figure 3 in dotted line.

Journalled upon the outer ends 5 of the bushings 3 and 4 is a differential housing 12 which is made up of two halves 13 and 14 each having a concentric boss 15 which is journalled upon the bushing 3 or 4. The half portion 13 is fitted with the usual crown ring gear 16. Both halves 13 and 14 are adapted to be bolted together in the usual manner and to be provided with a recess 17 into which the inner portions 10 of the bushings 3 and 4 extend. A pair of opposed longitudinal slots 18, see Figure 3, are provided in the half casing 14, the purpose of which will hereinafter appear.

Rockingly mounted upon the inner portions 10 of the bushings 3 and 4 are sleeves 19 and 20 each of which has a flange 21 from which four substantially concentric dogs 22 extend longitudinally of the axis and are adapted to extend between the corners of the square portion 6 of the bushings and the inner periphery of the recess 17 which serves as a clutch ring. Between the ends of adjacent dogs 22 and in normal contact therewith are pairs of clutch rollers, the rollers engageable in one direction of rotation being indicated by the numeral 23 and those in another direction being indicated by the numeral 24.

Each pair of rollers 23 and 24 is held apart by small coil springs 25 which pass freely through an aperture 9 in one of the radial lugs 8.

Figure 3:
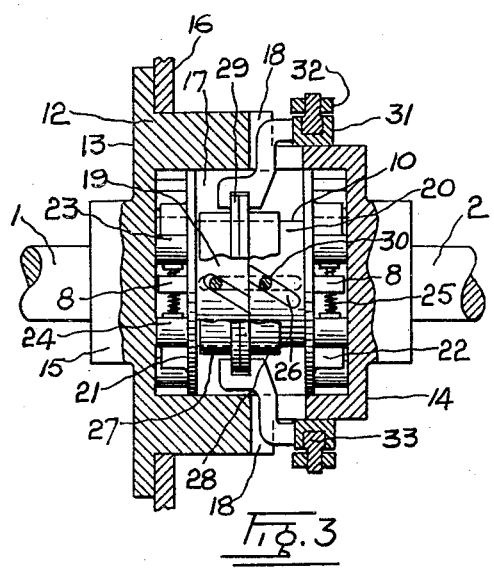
Fig. 3 is a horizontal sectional view of the invention taken on the line 3—3 of Figure 2.

Each of the sleeves 19 and 20 is diagonally slotted as at 26 from their innermost ends as shown in Figure 3. Surrounding the sleeves 19 and 20 are collars 27 and 28 having abutting flanges 29, and extending from each of the collars is a pin 30 which passes through the slot 26 and into the slot or keyway 11 of the inner portion 10 of the bushing so that each collar is free to slide endwise along its sleeve 19 and 20 and to impart a rocking movement thereto corresponding to the circumferential length of the slot 26.

Slidably mounted upon the half portion 14 of the housing 12 is a grooved ring 31 having a pair of forked arms 32 which extend through the slots 18 and engage the flanges 29 of the collars 27 and 28 to hold them in abutting relation and permit them to rotate freely and independently of each other and to move said collars longitudinally of the sleeves 19 and 20. The grooved ring 31 is provided with a trunnioned collar 33 in the usual manner and is actuated by a bell crank 34, suitably mounted adjacent the differential, and a rod 35 to which motion is imparted through a suitable lever, not shown, disposed in a convenient position adjacent the driver's seat.

Figure 4:
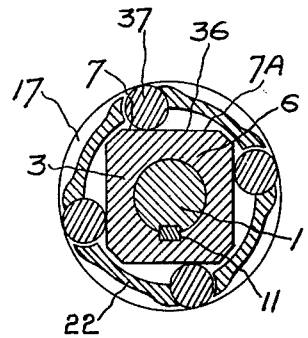
Fig. 4 is a transverse sectional view showing a modified form of the invention.

In the modification shown in Figure 4 the intermediate squared portion 6 is not divided by radial lugs as in the previously described structure, but each of its squared faces 36 is in effect divided equally into clutch faces 7 and 7A as before described and instead of using pairs of clutch rollers 23 and 24 a single clutch roller 37 is employed between each of the faces 36 and the inner periphery or clutch ring of the differential housing 12, the rollers being urged into the position desired between the faces 7 and the inner periphery of the clutch ring, or between the faces 7A and the clutch ring, by the dogs 22. It will of course be obvious that no driving engagement will take place when the rollers are held in intermediate position between the faces 7 and 7A.

The operation of the device is as follows:—

Figure 2:
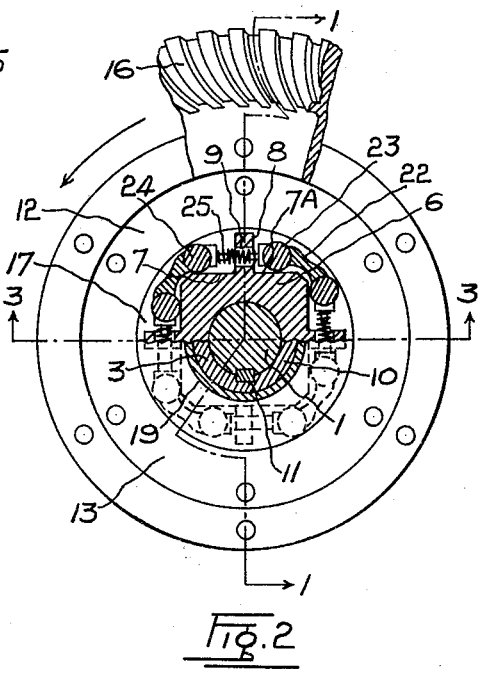
Fig. 2 is a transverse sectional view of the invention taken on the line 2—2 of Figure 1.

When the bell crank 34 is set to the left, as shown in Figures 1 and 3, so that the collars 27 and 28 are moved to the limit of their stroke and towards the bushing 3, the dogs 22 are moved in an anti-clockwise direction as shown in Figure 2, thus the clutch rollers 24 are lightly forced, through the rollers 23 and the springs 25, into engagement with the clutch faces 7 of the squared portion 6 of the bushings 3 and 4 and the inner periphery or clutch ring of the differential housing, so that if the housing is being turned in an anti-clockwise direction clutching engagement will be made through the rollers 24 to the bushings and the shafts 1 and 2.

In the modification the drive is communicated in either direction by the rollers 37 by urging the dogs 22 in clockwise or anti-clockwise direction to move said rollers onto the faces 7 or 7A.

If the car to which the device is fitted is turned, the drive will be communicated to the axle connected to the inside wheel and the axle of the outside wheel will over run the differential housing. Obviously if the car is on a decline of sufficient grade both axles and their bushings 3 and 4 will over run the differential housing, performing under such circumstances in a similar manner to the usual free wheeling roller or ball clutch mechanism.

When it is desired to drive the car rearwardly, the bell crank is moved in an opposite direction to draw the collars 27 and 28 to the right or towards the bushing 4 when the clutch rollers 23 are brought into engaging contact between the clutch faces 7A and the inner periphery or clutch ring of the differential housing and the rollers 24 are correspondingly removed from engagement.

By virtue of the springs 25 holding either the rollers 23 or 24 in engagement with the one or other of the clutch faces 7 and 7A and the inner periphery or clutch ring of the housing, it will be readily seen that according to the structure shown all four rollers of a set will engage simultaneously, so that the drive will be equally divided between them and also that no slack can exist to produce back lash in the device.

When it is desired to use the motor for a brake when running in one direction the bell crank is moved to set the differential for operation in the opposite direction, so that the momentum of the vehicle is in part transmitted through the differential to drive the motor.

What I claim as my invention is:

1. The combination with a pair of aligned shafts and a differential housing, a pair of reversable one way clutches within the housing, each clutch comprising a clutch ring integral with the housing, a bushing secured to each of the shafts, an enlargement integral with each bushing, and rotatable means between the enlargement and the clutch ring for imparting the drive from the housing to the enlargements and their shafts, a rocking sleeve on each of the bushings for selectively locating the rotatable means to impart the drive in opposite directions, a collar on each sleeve for rocking same, and means slidable upon the housing for imparting endwise movement to the collars.

2. The combination with a pair of aligned shafts and a differential housing, a pair of reversable one way clutches within the housing, each clutch comprising a clutch ring integral with the housing, a bushing secured to each of the shafts, an enlargement integral with each bushing, and rotatable means between the enlargement and the clutch ring for imparting the drive from the housing to the enlargements and their shafts, a rocking sleeve on each of the bushings for selectively locating the rotatable means to impart the drive in opposite directions, a collar on each sleeve for rocking same, and means slidable upon the housing for imparting endwise movement to the collars, said means consisting of a ring having forked arms extending through said housing to engage the collars and a trunnioned collar for imparting endwise movement to the ring.

Dated at Vancouver, B. C., this 3rd day of February, 1932.

WILLIAM CLIFFORD WITHERLY.